(12) United States Patent
Huang et al.

(10) Patent No.: US 7,532,369 B2
(45) Date of Patent: May 12, 2009

(54) HANDHELD MULTI-FUNCTION PERIPHERAL CAPABLE OF SCANNING

(76) Inventors: Chih-Wen Huang, 3F, No. 13, Alley 3, Lane 33, Gungkou St., Hsinchu (TW); Chui-Kuei Chiu, No. 215, Sec. 1, Hengshan St., Hengshan Shiang, Hsinchu (TW)

( * ) Notice: Subject to any disclaimer, the term of this patent is extended or adjusted under 35 U.S.C. 154(b) by 677 days.

(21) Appl. No.: 10/059,293

(22) Filed: Jan. 31, 2002

(65) Prior Publication Data
US 2002/0169509 A1    Nov. 14, 2002

(30) Foreign Application Priority Data
May 11, 2001    (TW) ............................... 90111384 A

(51) Int. Cl.
*H04N 1/04*    (2006.01)
(52) U.S. Cl. ...................... 358/474; 358/473; 358/497; 382/167
(58) Field of Classification Search ................ 358/474, 358/505, 1.15, 497, 496, 473, 475, 478, 402, 358/296, 486, 487; 250/208.1, 236; 235/472.01; 710/300; 382/313
See application file for complete search history.

(56) References Cited
U.S. PATENT DOCUMENTS

| | | | | |
|---|---|---|---|---|
| 4,762,994 A | * | 8/1988 | Byerly et al. | 250/236 |
| 5,704,029 A | * | 12/1997 | Wright, Jr. | 715/505 |
| 5,822,230 A | * | 10/1998 | Kikinis et al. | 708/109 |
| 5,889,597 A | * | 3/1999 | Ara et al. | 358/473 |
| 5,923,042 A | * | 7/1999 | Mietta et al. | 250/559.06 |
| 6,000,867 A | * | 12/1999 | Yoshii et al. | 400/188 |
| 6,608,297 B2 | * | 8/2003 | Neukermans et al. | 250/208.1 |
| 6,795,203 B1 | * | 9/2004 | Akahane et al. | 358/1.1 |
| 7,155,070 B2 | * | 12/2006 | Steinberg | 382/313 |
| 2002/0011558 A1 | * | 1/2002 | Neukermans et al. | 250/236 |
| 2003/0038963 A1 | * | 2/2003 | Yamaguchi | 358/1.15 |
| 2003/0116631 A1 | * | 6/2003 | Salvato et al. | 235/472.01 |

FOREIGN PATENT DOCUMENTS

GB    2386017 A  *  3/2003

* cited by examiner

*Primary Examiner*—Negussie Worku
(74) *Attorney, Agent, or Firm*—Stolowitz Ford Cowger LLP

(57) ABSTRACT

A handheld Multi-Function Peripheral (MFP) capable of scanning includes the operation panel, the control processing unit, and the scanning apparatus. The operation panel is for the user to input a data and a scanning order. The control processing unit is for proceeding logic operation and data processing, and receiving the scanning order. The scanning apparatus includes the scanning channel, the light source, and the photoelectronic imaging device. The scanning channel is the passage for the to-be-scanned document. The light source and the photoelectronic imaging device are equipped in the one side of the scanning channel to provide the light for scanning and capture image of the to-be-scanned document, respectively.

30 Claims, 5 Drawing Sheets

HANDHELD MULTI-FUNCTION PERIPHERAL CAPABLE OF SCANNING

This application incorporates by reference Taiwanese application Serial No. 90111384, Filed May 11, 2001.

BACKGROUND OF THE INVENTION

1. Field of the Invention

The invention relates in general to a handheld Multi-Function Peripheral (MFP), and more particularly to the handheld Multi-Function Peripheral capable of scanning.

2. Description of the Related Art

With the rapid evolution of high technology, electronic products are being developed quickly. The electronic products, such as scanner, printer, and cellular phone, bring the convenience to the modern life. However, in the city with high population, the living space is too small for placing these products. Multi-Function Peripheral (or Multi-Function product, MFP), a product with several functions, is therefore produced to save the living space. The hand held MFP, with advantages of Multi-Function and portability, become the most popular product nowadays. With the portability, the hand held MFP can help people to record the daily schedule and deal with the business anywhere and anytime. The hand held MFP usually possesses the functions of Personal Digital Assistant (PDA), Calculator, Cellular Phone, and Game. The hand held MFP with the appearance of PDA is described below.

Referring to FIG. 1, which depicts a conventional Personal Digital Assistant (PDA). The PDA 100 includes a base 102, a display 104, three control buttons 106, and a stylus 108. The display 104, such as a touch screen integrated into Liquid Crystal Display (LCD), is mounted on the top surface 110 of the base 102. The control buttons 106 equipped on the top surface 110 of the base 102 are easy to operate. The removable stylus 108 is placed in the stylus holder 112 and can be remove from the stylus holder 112, or insert into the stylus holder 112 along the direction of arrow 150 as needed. It is very convenient that the messages are input into the PDA 100 by touching the display 104 with the stylus 108. Besides, the PDA is connected to the internet via wireless communication so that user is able to surf the internet, browse the web sites, upload or download the data in real-time.

Additionally, people usually exchange the business cards when they first meet each other. User can use PDA to input the content of the business card for building the digital files; however, it is inconvenient that PDA requires manual entry of data either using a miniaturized keyboard, or by cursive writing with a stylus on the PDA word by word. User also can use the flatbed scanner to scan the business card and then transmit the image PDA; however, the flatbed scanner is too large to carry. Accordingly, incorporating a very small scanner into a PDA would significantly enhance the usefulness for data entry. For example, a business card or a picture could be scanned directly into the PDA and the scanned image is converted to digital data, and edited or modified by user. Therefore, how to develop a portable electronic product such as PDA with scanning function, especially a portable multi-function peripheral with scanning function is very important for the research workers.

SUMMARY OF THE INVENTION

It is therefore an object of the invention to provide a handheld Multi-Function Peripheral (MFP) capable of scanning by integrating the scanning apparatus into the handheld device. With the two-in-one handheld MFP according to the invention, consumer can save the money without purchasing the scanner, and also easy to scan the image anywhere and anytime.

According to the objective of the invention, the handheld MFP includes the operation panel, the control processing unit, and the scanning apparatus. The operation panel is for the user to input a data and a scanning order. The control processing unit is electrically connected to the operation panel for proceeding logic operation and data processing, and receiving the scanning order. The scanning apparatus is electrically connected to the control processing unit for scanning the to-be-scanned document, and the control processing unit controls the scanning operation of the scanning apparatus after receiving the scanning order. The scanning apparatus includes the scanning channel, the light source, and the photoelectronic imaging device. The scanning channel is the passage for the to-be-scanned document. The light source and the photoelectronic imaging device are equipped in the one side of the scanning channel to provide the light for scanning and capture image of the to-be-scanned document, respectively.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

The handheld Multi-Function Peripheral (MFP) capable of scanning is designed in the invention. Users can use it to scan the images of the documents, the business cards, the pictures, or the photographs anywhere and anytime. Usually, the Personal Digital Assistant (PDA), the Calculator, the Cellular phone, and the Game are integrated into the handheld Multi-Function Peripheral (MFP). The hand held MFP with the appearance of PDA is described in the first embodiment of the invention, and the hand held MFP with the appearance of calculator is described in the second embodiment of the invention.

EXAMPLE 1

Figure 1:
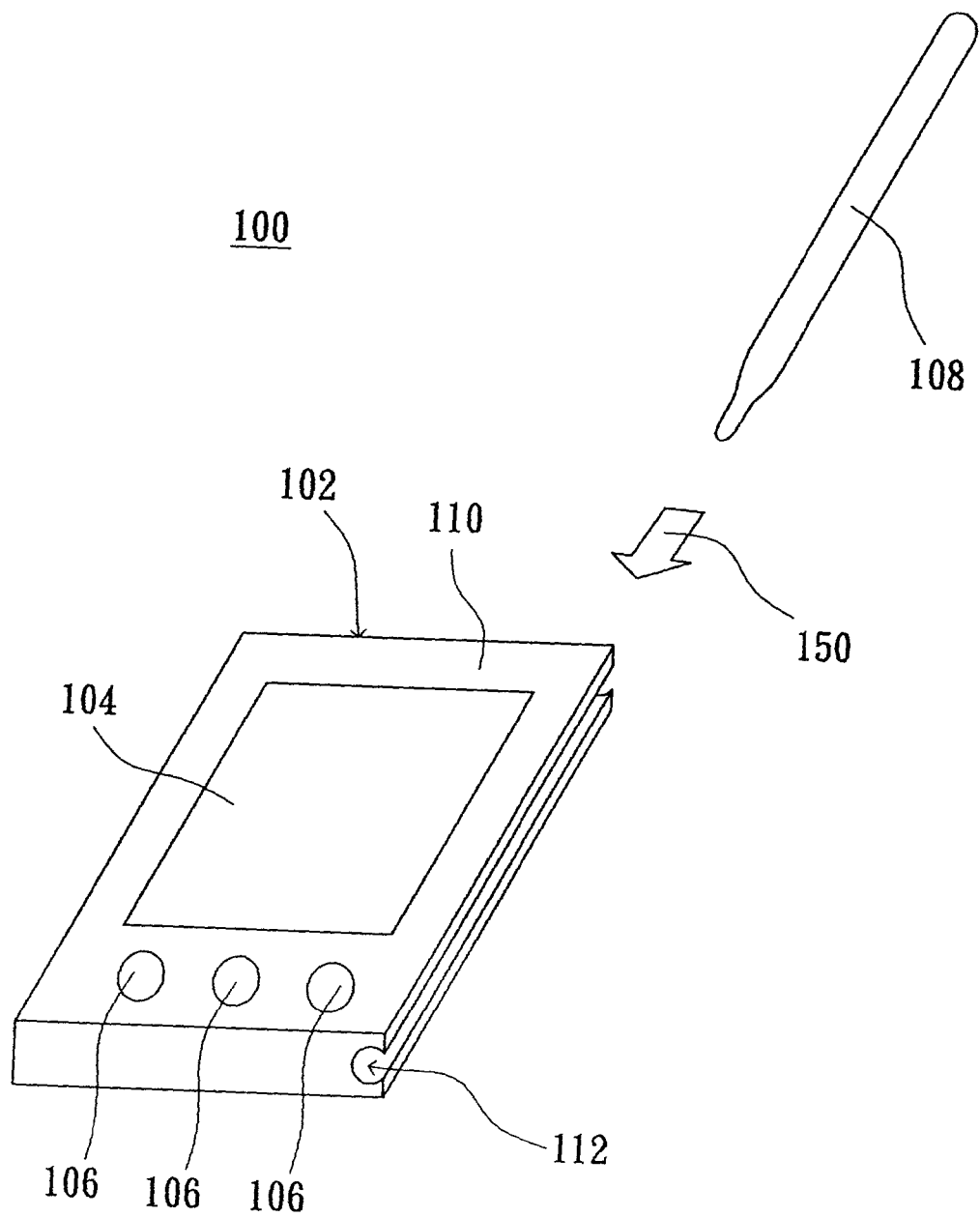
FIG. 1 depicts a conventional Personal Digital Assistant (PDA)
Figure 2A:
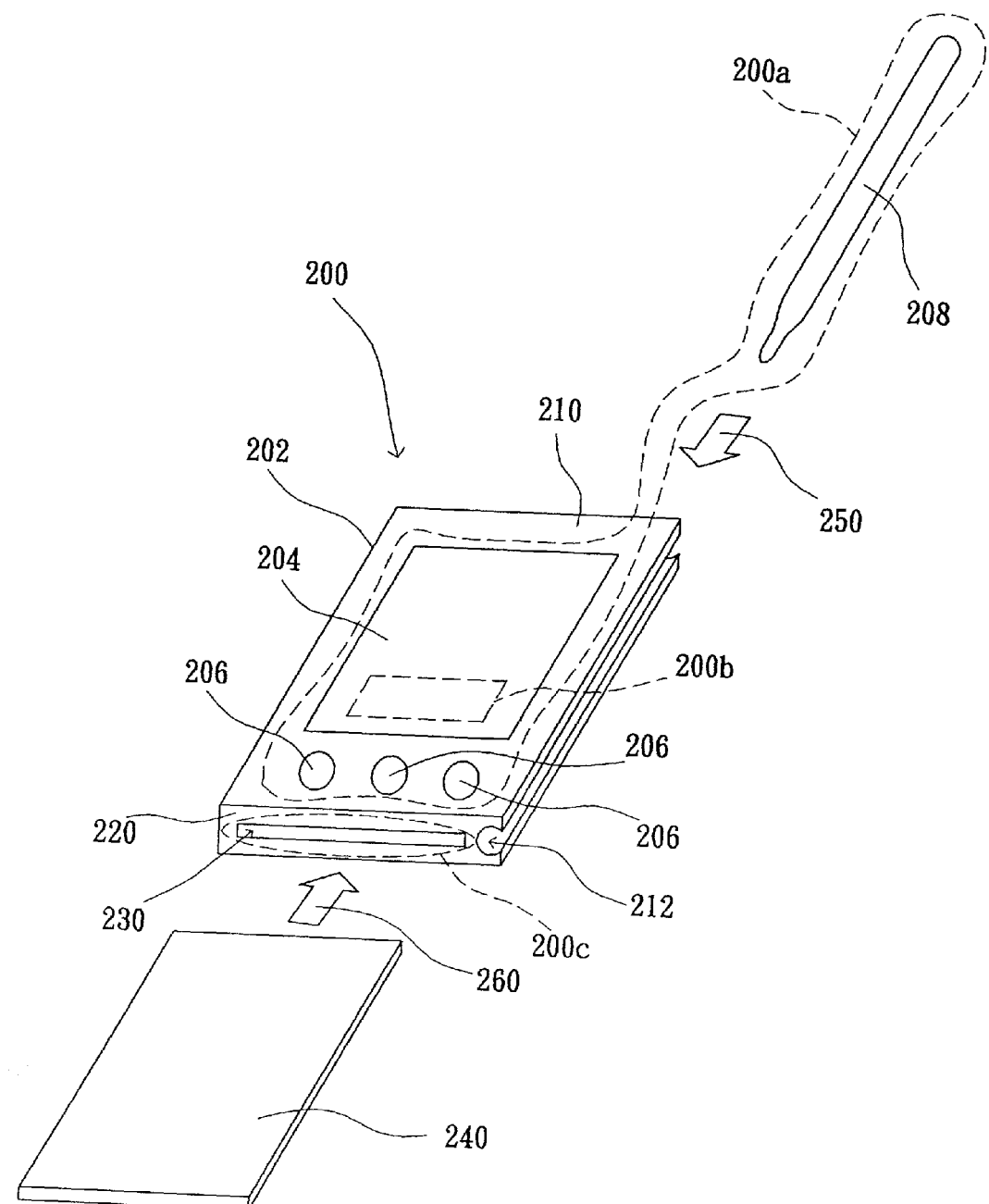
FIG. 2A depicts a handheld Multi-Function Peripheral (MFP) with scanning function according to the first embodiment of the invention.

Referring to FIG. 2A, which depicts a handheld Multi-Function Peripheral (MFP) with scanning function according to the first embodiment of the invention. The handheld MFP with the appearance of PDA is described herein. In FIG. 2A, the PDA 200 includes a operation panel 200a, a control processing unit 200b, and a scanning apparatus 200c, which the operation panel 200a and the scanning apparatus 200c are electrically connected to the control processing unit 200b. The operation panel 200a is for user to input the data and scanning instruction. The control processing unit 200b is for proceeding the logic operation or data processing, also receiving the scanning order from the scanning apparatus 200c. For example, after user input the data or the scanning order to the PDA 200 via the operation panel 200a, the logic operation is processed by the control processing unit 200b, such as Microprocessor, and the control processing unit 200b also controls the operation of the scanning apparatus 200c. Accordingly, the PDA 200 is two-in-one device and possesses the functions of PDA and the scanner.

The PDA 200 further has a base 202. The operation panel 200a includes a display 204, three of control buttons 206, and a stylus 208. The display 204 such as a touch screen integrated with Liquid Crystal Display (LCD) and the control buttons 206, are mounted on the top surface 210 of the base 202 for operation. The removable stylus 208 is placed in the stylus holder 212 of the base 202 and can be remove from the stylus holder 212, or insert into the stylus holder 212 along the direction of arrow 250 as needed. To process the logic and/or scanning operation, the user can input data and/or give the scanning order to the PDA 200 by slightly touching the display 204 with the stylus 208. The control processing unit 200b is situated inside the base 202 and electronically connected to the display 204 for receiving and processing the data/the scanning order transmitted from display 204.

In order to add the scanning function of the invention, the scanning apparatus 200c is integrated into the PDA 200. The scanning apparatus 200c is situated inside the base 202, and a scanning channel 230, which is designed as the passage for the to-be scanned document 240, passes through the base 202 from the lateral side 220 to the opposite side. To proceeding the scan, the to-be scanned document 240 is inserted into the scanning channel 230 along the direction of the arrow 260.

Figure 2B:
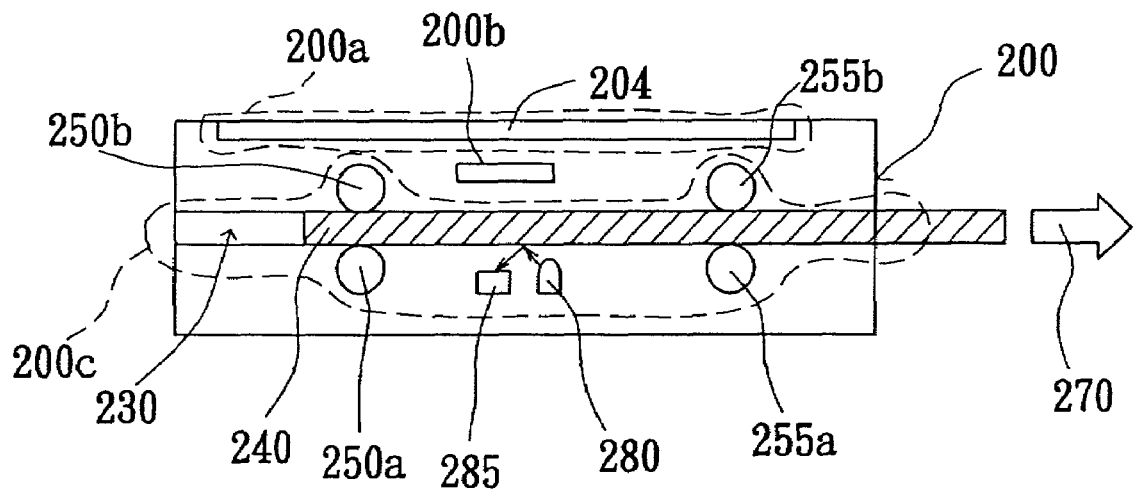
FIG. 2B depicts a cross-sectional drawing of the PDA in FIG. 2A which is scanning the to-be-scanned document.

Referring to FIG. 2B, which depicts a cross-sectional drawing of the PDA in FIG. 2A which is scanning the to-be-scanned document. The to-be-scanned document 240 is inside the scanning channel 230. In FIG. 2B, the scanning apparatus 200c of the PDA 200 further includes the rollers 250a, 250b, 255a, and 255b, the light source 280, and the photoelectronic imaging device 285. The rollers 250a and 250b are opposite set on two sides of the scanning channel 230, and so do the rollers 250c and 250d. The PDA 200 provides power to drive the rollers 250a, 250b, 255a, and 255b so that the to-be-scanned document 240 is transmitted in the scanning channel 230 along the direction of the arrow 270. The light source 280 and the photoelectronic imaging device 285 are situated under the scanning channel 230. The light source 280, such as the Light Emitting Diode (LED), is situated close to the scanning channel 230 to provide the light for scanning. The photoelectronic imaging device 285 can be any device capable of converting the light signal into the electric signal, such as Charged Coupled device (CCD) or Contact Image Device (CIS).

When the user want to scan the to-be-scanned document 240, the scanning order is given to the PDA 200 by touching the display 204 with the stylus 208, and transmitted to the control processing unit 200b to start the scanning operation. During scanning, the light emitted from the light source 280 is reflected by the to-be-scanned document 240, and then further reflected by several lens (not shown in FIG. 2B) and focused on the photoelectronic imaging device 285 by the lens (not shown in FIG. 2B). Afterward, the light received by the photoelectronic imaging device 285 is converted into electronic signals, and then produce machine-readable data, which is representative of the image of the to-be-scanned document 240.

The rollers 250a, 250b, 255a, and 255b are used for transmitting the to-be-scanned document 240 along the direction of the arrow 270 during scanning. After the photoelectronic imaging device 285 complete the scanning, the image of the to-be-scanned document 240 can be shown on the display 204, and it is very convenient for user to edit the image on the display 204 directly. Also, another advantage of the PDA 200 with scanning function is the user can upload the scanned image to the computer or other electric devices through the PDA 200 via wireless communication. The to-be-scanned document abovementioned particularly means the non-transparent document that can reflect the light. To scan the transparent document, the scanning apparatus 200c is equipped the same except moving the light source 280 above the scanning channel 230 so that the transmission of the light can be focused on the photoelectronic imaging device 285.

Figure 2C:
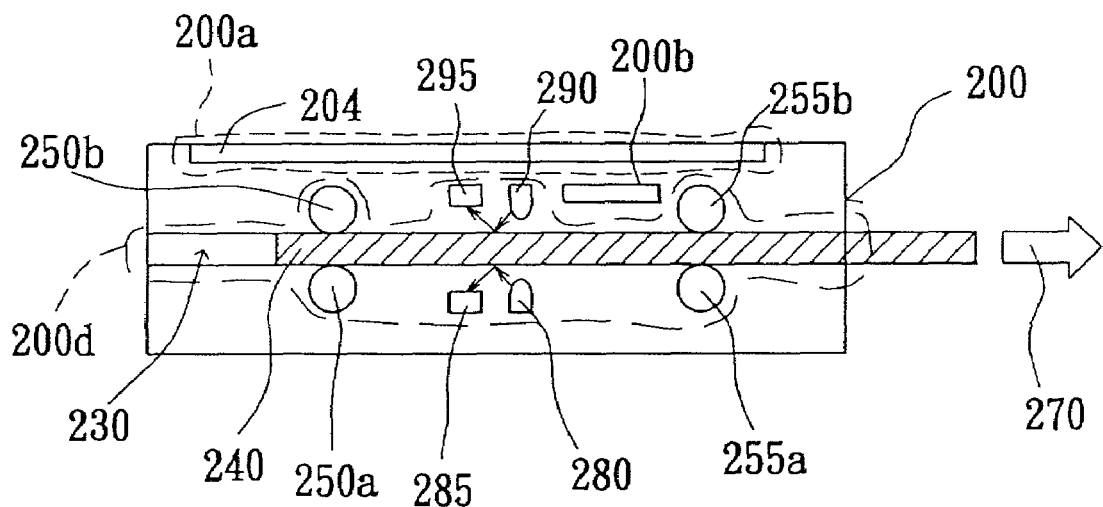
FIG. 2C depicts a set of the light source and the photoelectronic imaging device further equipped in the PDA of FIG. 2B.

However, some to-be-scanned documents are two-sided, such as the business card. Referring to FIG. 2C, which depicts a set of the light source and the photoelectronic imaging device further equipped in the PDA of FIG. 2B. In FIG. 2C, a set of the light source 290 and the photoelectronic imaging device 295 can be further equipped above the scanning channel 230 in the PDA 200 in order to scan the two-sided document. Therefore, it is timesaving that the scanning apparatus 200d of the PDA 200, assembled by the light sources 280, 290 and the photoelectronic imaging devices 285 and 295, simultaneously captures the images of the two-sided document during scanning.

The user can see the scanning condition of the to-be-scanned document 240, which is shown on the display 204 of the PDA 200. However, the one of ordinary skill in the art should know that the invention is not limited to the disclosed embodiment. The aforementioned scanning apparatus 200c can be modified on the premise that the portable PDA is easy to carry, such as replacing the rollers 250a, 250b, 255a, and 255b with other transmission mechanism or manual operation. Also, the scanning operation can be started by the touch of the transmission mechanism with the to-be-scanned document 240, and the user can control the scanning operation by press the control buttons 206.

EXAMPLE 2

Figure 3A:
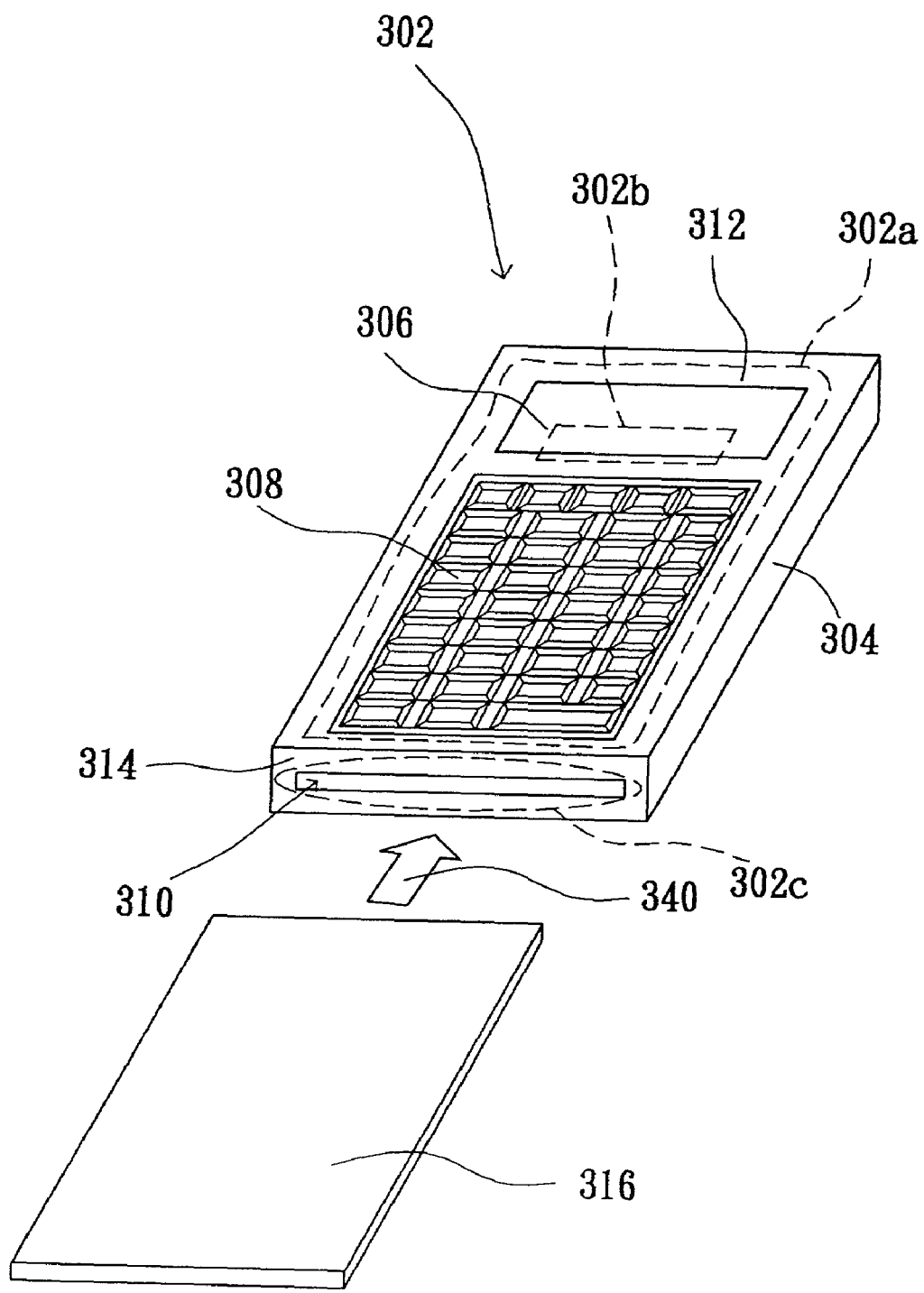
FIG. 3A depicts a handheld Multi-Function Peripheral (MFP) with scanning function according to the second embodiment of the invention.

Referring to FIG. 3A, which depicts a handheld Multi-Function Peripheral (MFP) with scanning function according to the second embodiment of the invention. The handheld MFP with the appearance of calculator is described herein. In FIG. 3A, the calculator 302 includes a operation panel 302a, a control processing unit 302b, and a scanning apparatus 302c, which the operation panel 302a and the scanning apparatus 302c are electrically connected to the control processing unit 302b. The operation panel 302a is for user to input the data and scanning instruction. The control processing unit 302b is for proceeding logic operation or data processing, and also taking the scanning order from the scanning apparatus 302c. For example, after user input the data or the scanning order to the calculator 302 via the operation panel 302a, the control processing unit 302b, such as Microprocessor, processes the logic operation and controls the operation of the scanning apparatus 302c. Accordingly, the calculator 302 is two-in-one device and possesses the functions of calculator and the scanner.

The calculator 302 further has a base 304. The operation panel 302a includes a display 306, and the key part 308. The display 306, such as a Liquid Crystal Display (LCD), is mounted on the top surface 312 of the base 304. The key part 308 for input the data and scanning order are mounted on the top surface 312 of the base 304 beside the display 306. When the user input the data and/or giving the scanning by press the key part 306, the calculator 302 is going to proceed the logic and/or scanning operation.

In order to add the scanning function of the invention, the scanning apparatus 302c is integrated into the calculator 302. The scanning apparatus 302c is situated inside the base 304, and a scanning channel 310, which is designed as the passage for the to-be scanned document 316, passes through the base 304 from the lateral side 314 to the opposite side. To proceeding the scan, the to-be scanned document 316 is inserted into the scanning channel 310 along the direction of the arrow 340.

Figure 3B:
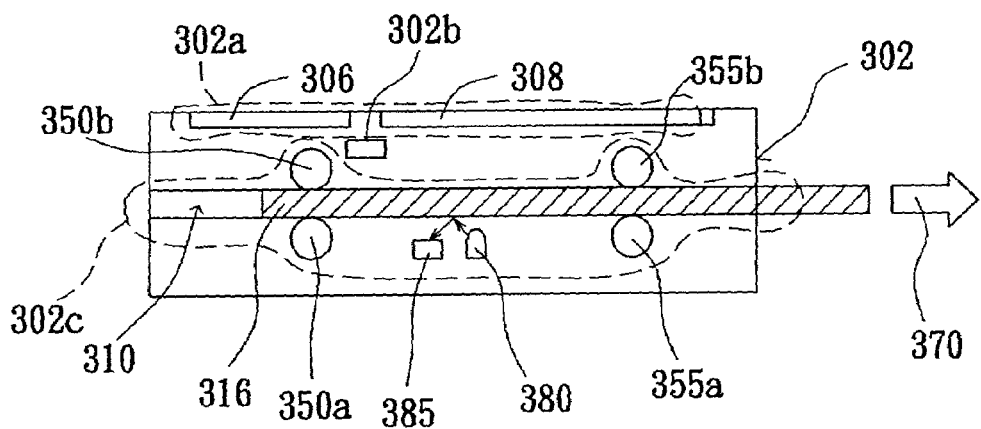
FIG. 3B depicts a cross-sectional drawing of the calculator in FIG. 3A which is scanning the to-be-scanned document.

Referring to FIG. 3B, which depicts a cross-sectional drawing of the calculator in FIG. 3A which is scanning the to-be-scanned document. The to-be-scanned document 316 is inside the scanning channel 310. In FIG. 3B, the scanning apparatus 302c of the calculator 302 further includes the rollers 350a, 350b, 355a, and 355b, the light source 380, and the photoelectronic imaging device 385. The rollers 350a and 350b are opposite set on the two sides of the scanning channel 310, and so do the rollers 355a and 355b. The calculator 302 provides power to drive the rollers 350a, 350b, 355a, and 355b so that the to-be-scanned document 316 is transmitted in the scanning channel 310 along the direction of the arrow 370. The light source 380 and the photoelectronic imaging device 385 are situated under the scanning channel 310. The light source 380, such as the Light Emitting Diode (LED) with high illumination, is situated close to the scanning channel 310 to provide the light for scanning. The photoelectronic imaging device 385 can be any device capable of converting the light signal into the electric signal, such as Charged Coupled device (CCD) or Contact Image Device (CIS).

When the user want to scan the to-be-scanned document 316, the scanning order is given to the calculator 302 by pressing the key part 308 directly, and transmitted to the control processing unit 302b to start the scanning operation. During scanning, the light emitted from the light source 380 is reflected by the to-be-scanned document 316, and then further reflected by several lens (not shown in FIG. 3B) and focused on the photoelectronic imaging device 385 by the lens (not shown in FIG. 3B). Afterward, the light received by the photoelectronic imaging device 385 is converted into electronic signals, and then produce machine-readable data, which is representative of the image of the to-be-scanned document 316.

The rollers 350a, 350b, 355a, and 355b are used for transmitting the to-be-scanned document 316 forward along the direction of the arrow 370 during scanning. The to-be-scanned document 316 abovementioned particularly means the non-transparent document that can reflect the light. To scan the transparent document, the scanning apparatus 302c is equipped the same except moving the light source 380 above the scanning channel 310 so that the transmission of the light can be focused on the photoelectronic imaging device 385.

Figure 3C:
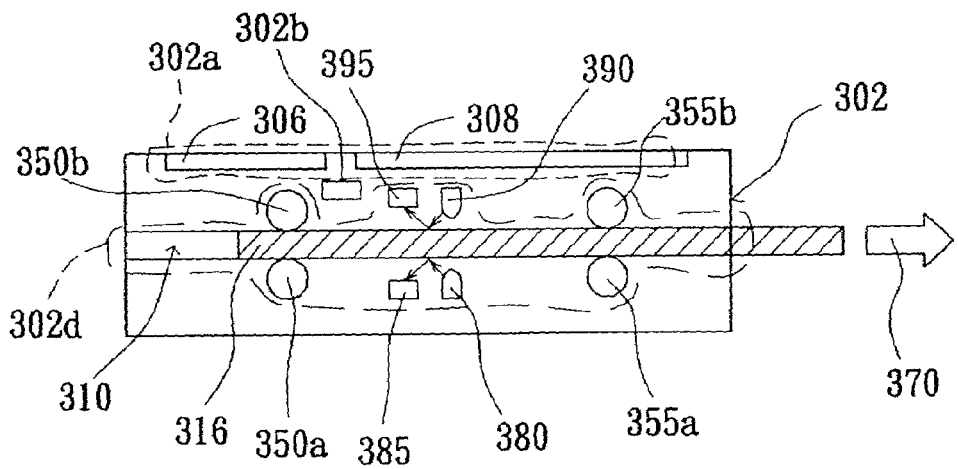
FIG. 3C depicts a set of the light source and the photoelectronic imaging device further equipped in the calculator of FIG. 3B.

However, some to-be-scanned documents are two-sided, such as the business card. Referring to FIG. 3C, which depicts a set of the light source and the photoelectronic imaging device further equipped in the calculator of FIG. 3B. In FIG. 3C, a set of the light source 390 and the photoelectronic imaging device 395 can be further equipped above the scanning channel 310 in the calculator 302 in order to scan the two-sided document. Therefore, it is timesaving that the scanning apparatus 302d, assembled by the light sources 380, 390 and the photoelectronic imaging devices 385 and 395, simultaneously captures the images of the two-sided document during scanning.

The user can see the scanning condition of the to-be-scanned document 316, which is shown on the display 306 of the calculator 302. However, the one of ordinary skill in the art should know that the invention is not limited to the disclosed embodiment. The aforementioned scanning apparatus 302c can be modified on the premise that the portable calculator 302 is easy to carry, such as replacing the rollers 350a, 350b, 355a, and 355b with other transmission mechanism or manual operation. Also, the scanning operation can be started by the touch of the transmission mechanism with the to-be-scanned document 316.

According to the first and the second embodiments of the invention, the objective of the invention, that is the handheld MFP capable of scanning, can be achieved by integrating the scanning apparatus into the handheld device. With this two-in-one handheld MFP, consumer can save the money without purchasing the scanner. Besides, the portability make the user easy to scan the image anywhere and anytime.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A handheld Multi-Function Peripheral (MFP), comprising:
   a housing;
   an operation panel at the housing, wherein the operation panel is configured to allow a user to input data and a scanning order; and
   a scanning apparatus positioned at least partially in the housing, wherein the scanning apparatus is configured to control a scanning operation after receiving the scanning order, and wherein the scanning apparatus comprises:
   a scanning channel configured as a passage in the housing for a to-be-scanned document to pass through;
   wherein the scanning channel and the operation panel lie in substantially parallel planes and substantially overlap one another in a direction substantially perpendicular to the substantially parallel planes.

2. The handheld MFP of claim 1, further comprising a Personal Digital Assistant (PDA).

3. The handheld MFP of claim 2, wherein the PDA further comprises a display for showing the data and the scanning order.

4. The handheld MFP of claim 3, wherein the PDA display comprises a touch screen integrated with a Liquid Crystal Display (LCD).

5. The handheld MFP of claim 4, wherein the PDA further comprises a stylus, which is removably positioned on the PDA, for touching the PDA display to input the data and the scanning order, and wherein the stylus can be used to edit an image on the PDA display after scanning.

6. The handheld MFP of claim 2, wherein the PDA includes a control button configured to allow the user to input the data and the scanning order.

7. The handheld MFP of claim 1, further comprising a calculator.

8. The handheld MFP of claim 7, wherein the calculator further includes a display for showing the data and the scanning order.

9. The handheld MFP of claim 8, wherein the calculator display comprises a Liquid Crystal Display (LCD).

10. The handheld MFP of claim 8, wherein the calculator further includes a key part configured to allow the user to input the data and the scanning order.

11. The handheld MFP of claim 1, wherein the scanning apparatus further comprises a light source positioned in a side of the scanning channel to provide light for scanning, and wherein the light source comprises a Light Emitting Diode (LED).

12. The handheld MFP of claim 1, wherein the scanning apparatus further comprises a transmission mechanism for transmitting the to-be-scanned document through the scanning channel.

13. The handheld MFP of claim 12, wherein the transmission mechanism includes one or more rollers.

14. The handheld MFP of claim 1, wherein the to-be-scanned document comprises a business card.

15. The handheld MFP of claim 1, further comprising two photoelectronic imaging devices located on opposite sides of the scanning channel, wherein the scanning apparatus is configured to substantially concurrently scan both sides of the to-be-scanned document.

16. The handheld MFP of claim 15, wherein the scanning apparatus is configured to scan both sides of the to-be-scanned document while the document is being transmitted through the scanning channel from a first end of the MFP to a second end of the MFP opposite the first end.

17. The handheld MFP of claim 1, further comprising a photoelectronic imaging device positioned in a side of the scanning channel to capture an image of the to-be-scanned document.

18. The handheld MFP of claim 17, wherein the photoelectronic imaging device comprises a Charged Coupled Device (CCD).

19. The handheld MFP of claim 17, wherein the photoelectronic imaging device comprises a Contact Image Device (CID).

20. An apparatus, comprising:
a housing;
an operation panel at the housing, wherein the operation panel is configured to allow a user to input data and a scanning order;
a control processing unit positioned at least partially in the housing and electrically connected to the operation panel for directing logic operation, directing data processing, and receiving the scanning order; and
a scanning apparatus positioned at least partially in the housing and electrically connected to the control processing unit for performing a scanning operation on a to-be-scanned document, wherein the control processing unit is configured to control the scanning operation of the scanning apparatus after receiving the scanning order, and wherein the scanning apparatus comprises:
a scanning channel for the to-be-scanned document;
a light source positioned in a side of the scanning channel to provide light for scanning; and
a photoelectronic imaging device positioned in the side of the scanning channel to capture an image of the to-be-scanned document;
wherein the scanning channel and the operation panel lie in substantially parallel planes and substantially overlap one another in a direction substantially perpendicular to the substantially parallel planes, and wherein the scanning apparatus is configured to concurrently scan both sides of the to-be-scanned document.

21. The apparatus of claim 20, wherein the operation panel is configured to display the image of the to-be-scanned document in response to the scanning operation.

22. The apparatus of claim 20, wherein the operation panel is configured to receive an input from a user to control the scanning operation.

23. The apparatus of claim 20, further comprising a second light source and a second photoelectronic imaging device located on an opposite side of the scanning channel as the light source and the photoelectronic imaging device.

24. The apparatus of claim 23, wherein the second photoelectronic imaging device is configured to capture a second image of the to-be-scanned document, and wherein both the image and the second image are captured substantially concurrently.

25. An apparatus, comprising:
means for entering a scanning job comprising an operational panel;
means for transmitting a document through a scanning channel;
means for scanning a first image of a first side of the document; and
means for scanning a second image of a second side of the document, wherein the second side is opposite the first side, wherein the first and second images are substantially concurrently scanned, and wherein the scanning channel and the operation channel lie in substantially parallel planes and substantially overlap one another in a direction substantially perpendicular to the substantially parallel planes.

26. The apparatus of claim 25, wherein the apparatus is a hand-held Multi-Function Peripheral.

27. The apparatus of claim 25, wherein the means for entering a scanning job is located directly above the scanning channel.

28. The apparatus of claim 25, wherein the scanning channel is oriented below the means for entering the scanning job in an approximately horizontal plane.

29. The apparatus of claim 28, wherein the scanning channel is configured to transmit the document from a first end of the apparatus and out a second end of the apparatus opposite the first end.

30. The apparatus of claim 28, wherein both the first and second images are substantially concurrently scanned while the document is being transmitted through the scanning channel in the approximately horizontal plane.

* * * * *

UNITED STATES PATENT AND TRADEMARK OFFICE
CERTIFICATE OF CORRECTION

PATENT NO. : 7,532,369 B2  
APPLICATION NO. : 10/059293  
DATED : May 12, 2009  
INVENTOR(S) : Huang et al.

It is certified that error appears in the above-identified patent and that said Letters Patent is hereby corrected as shown below:

At column 8, line 35, please replace "operational panel" with --operation panel--.
At column 8, line 44, please replace "operation channel" with --operation panel--.

Signed and Sealed this

Twenty-eighth Day of September, 2010

David J. Kappos
*Director of the United States Patent and Trademark Office*